United States Patent [19]

Cheresnowsky

[11] 4,214,896
[45] Jul. 29, 1980

[54] PROCESS FOR PRODUCING COBALT METAL POWDER

[75] Inventor: Michael J. Cheresnowsky, Towanda, Pa.

[73] Assignee: GTE Products Corporation, Stamford, Conn.

[21] Appl. No.: 38,973

[22] Filed: May 14, 1979

[51] Int. Cl.² ............................................. C22B 23/04
[52] U.S. Cl. .................................. 75/0.5 AA; 75/119; 423/143
[58] Field of Search ........................ 75/0.5 AA, 119; 423/143

[56] References Cited

U.S. PATENT DOCUMENTS

| 2,826,499 | 3/1958 | Schlecht et al. ............ 75/119 X |
| 2,879,137 | 3/1959 | Bare et al. ................. 75/119 X |
| 3,928,530 | 12/1975 | Bakker et al. .............. 75/119 X |
| 3,933,976 | 1/1976 | Nikolic et al. ............. 423/144 |
| 4,093,450 | 6/1978 | Doyle et al. .............. 75/0.5 AA |
| 4,108,640 | 8/1978 | Wallace et al. ............ 75/0.5 AA |

FOREIGN PATENT DOCUMENTS

1583864 2/1972 Fed. Rep. of Germany.
2319703 10/1973 Fed. Rep. of Germany.

*Primary Examiner*—G. Ozaki
*Attorney, Agent, or Firm*—John C. Fox

[57] ABSTRACT

A method for producing extra fine cobalt metal powder (up to 1.7 FSSS) by the digestion of cobalt pentammine chloride in a dilute ammonium hydroxide solution to form a cobalt-containing precipitate, followed by reducing the precipitate in a hydrogen atmosphere to cobalt metal powder, is improved by: (a) adding NaOH to the mother liquor containing cobalt species in solution, to form a cobalt-containing precipitate; and (b) either heating the precipitate in hydrogen to reduce it to cobalt metal powder or recycling the precipitate as a cobalt source for the formation of cobalt pentammine chloride. The final cobalt metal powder is useful, for example, as a starting material in the manufacture of cemented carbides.

10 Claims, 1 Drawing Figure

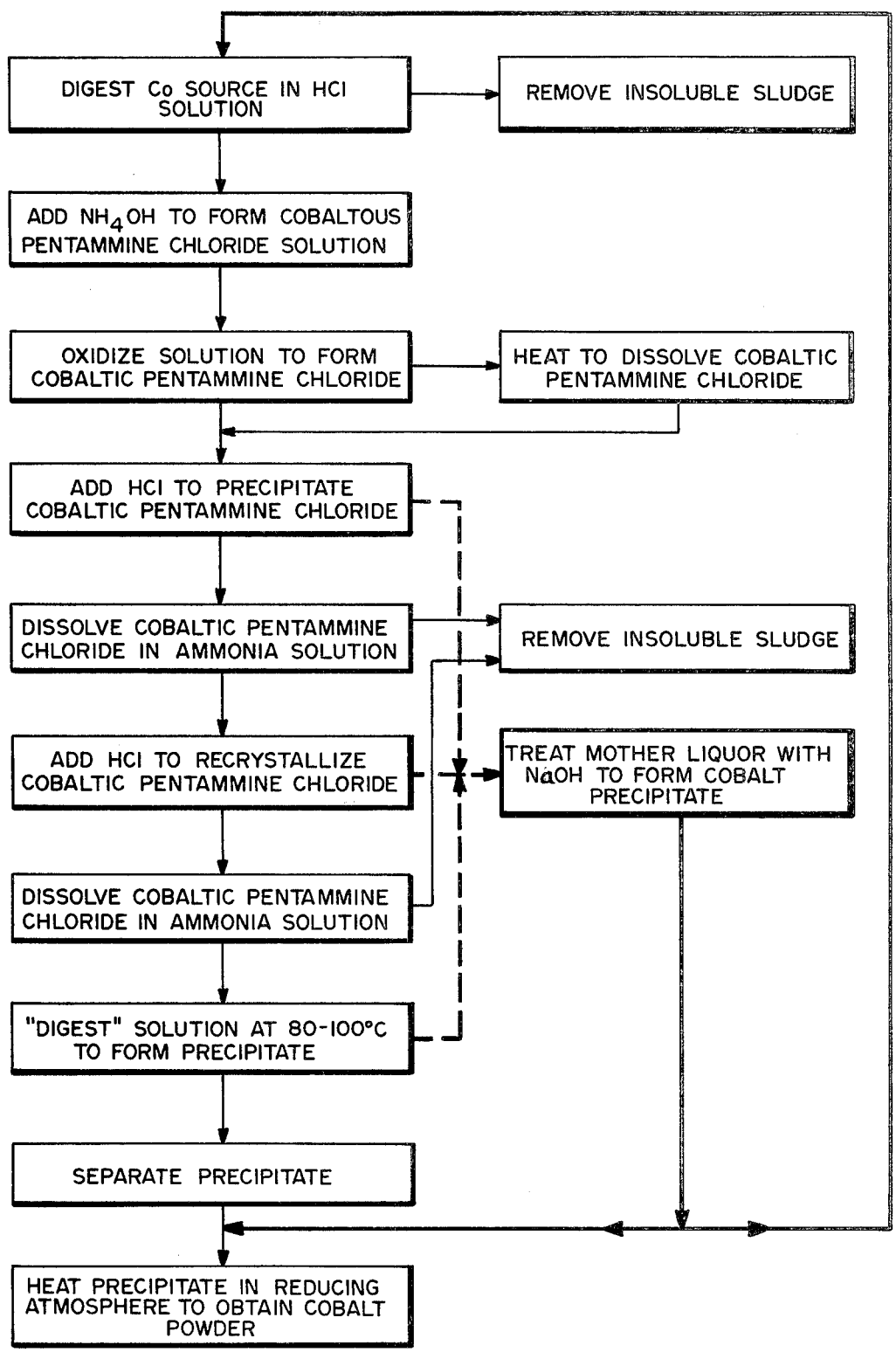

PROCESS FOR PRODUCING COBALT METAL POWDER

CROSS REFERENCE TO RELATED APPLICATIONS

Co-pending U.S. patent application Ser. No. 010,769, filed Feb. 9, 1979, a continuation of Ser. No. 911,595, now abandoned, describes a method for obtaining fine particle size cobalt by hydrogen reduction of a precipitate obtained from a cobalt pentammine chloride solution. Co-pending U.S. patent application 038,968, filed concurrently herewith, describes an improvement of the method of Ser. No. 010,769, involving removal of cobalt from solution by ion exchange. Application 038,972, also filed concurrently herewith, describes a method for the production of cobalt metal powder involving the recycling of ammonia. Application 038,971, also filed concurrently herewith, describes a method for the production of cobalt metal powder from a precipitate obtained by treatment of a cobalt ammine complex with a metallic hydroxide. Application 038,970, also filed concurrently herewith, describes a method for producing cobalt hexammine compounds and cobalt metal powder.

TECHNICAL FIELD

This invention relates to an improved method for obtaining cobalt metal powder from a cobalt source, and more particularly relates to an improved method for obtaining such powder by the thermal reduction of a precipitate obtained by the digestion of a cobalt pentammine chloride solution.

BACKGROUND ART

According to German Patent No. 2,319,703, it is known to separate cobalt from nickel by a method which includes forming pentammine sulfate complexes of the two ions in solution. However, it has been found that soluble cobalt ammine sulfates can only be reduced while still in solution, under pressure, and with the aid of catalysts. Furthermore, the resulting cobalt powder is not fine particle size.

U.S. Pat. No. 4,093,450 to Doyle et al. describes a method for producing fine particle size cobalt metal powder by the hydrogen reduction of cobalt oxide obtained from a cobalt pentammine carbonate solution. The precipitate was formed by heating the solution to drive off ammonia and carbon dioxide to form a precipitate of cobalt oxide. This method requires a solution of approximately four grams per liter of cobalt to produce a sized metal powder having a particle size less than one micron. Note that the final resulting particle size is highly dependent on the concentration of cobalt employed in the aqueous solution.

The following patents are directed to the separation of cobalt from other cations, especially nickel. The resulting cobalt compounds are not disclosed as being sources for forming fine particle size cobalt.

U.S. Pat. No. 2,879,137 to Bare et al. discloses the treatment of an ammoniacal ammonium carbonate solution, obtained from leaching an ore and containing nickel wherein the cobalt present in the cobaltic state is treated with an alkali metal or alkaline earth metal hydroxide under controlled temperature conditions to precipitate the nickel free of cobalt.

U.S. Pat. No. 3,928,530 to Bakker et al. discloses a method for the separation of nickel and cobalt by forming pentammine chloride complexes and solution containing a high concentration of ammonium chloride, and precipitating cobalt pentammine chloride.

In German Patent No. 1,583,864, cobalt is recovered from scrap by digestion of the scrap in HCl and $MgCl_2$ solution, followed by removal of iron and chromium impurities by precipitation at a moderately acid pH followed by extracting a cobalt chloride complex with a long chain tertiary ammine in an aromatic solvent.

U.S. Pat. No. 4,108,640 to Wallace discloses a method for recovering metallic cobalt from an aqueous ammoniacal solution wherein the solution is contacted with a water immiscible liquid ion exchange reagent dissolved in an inert organic diluent to selectively extract the other metal from the solution and produce an organic extract loaded with the other metals in an aqueous cobalt bearing raffinate substantially free of the other metals.

DISCLOSURE OF THE INVENTION

In a method for the production of cobalt metal powder by the thermal reduction of a cobalt-containing precipitate obtained by the digestion of a cobalt pentammine chloride solution, the efficiency of the method is improved by: (a) adding an alkali or alkaline earth metal hydroxide to the mother liquor from the digestion step containing residual cobalt species in solution to form a cobalt-containing precipitate; and (b) either heating the precipitate in a reducing atmosphere to convert it to cobalt metal powder, or recycling the precipitate.

The final cobalt metal powder is useful, for example, as a starting material in the manufacture of cemented carbides.

BRIEF DESCRIPTION OF THE DRAWING

The FIGURE is a flow diagram of one embodiment of the method of the invention.

BEST MODE FOR CARRYING OUT THE INVENTION

For a better understanding of the present invention, together with other and further objects, advantages and capabilities thereof, reference is made to the following disclosure and appended claims in connection with the above described drawing.

The method for producing fine particle size cobalt metal powder, herein referred to as the "basic" method, of which the present invention is an improvement, is described and claimed in copending patent application Ser. No. 010,769, filed Feb. 9, 1979, and assigned to the present assignee. However, a brief summary of that method will be set forth to aid the practitioner.

Crude cobalt pentammine chloride (that is, cobalt pentammine chloride containing 1000 parts per million or greater of Fe and 1.0 weight percent or greater of other cation impurities) is obtained by a method including the steps of: (1) digestion of a cobalt source in hydrochloric acid solution to obtain a solution of about 60 to 150 grams per liter of cobalt in 1 to 6 molar hydrochloric acid solution having a pH of about 0.1 to 1.5; (2) addition of ammonium hydroxide to result in a concentration of about 100 to 150 grams per liter of ammonium chloride and a pH of about 9.2 to 10; (3) oxidation of the cobaltous ion to cobaltic to form soluble cobaltic pentammine chloride, such as by aeration or contact with an oxidizing agent such as hydrogen peroxide or a combination of these, typically for a time of about 1 to 10 hours, and preferably about 2 to 8 hours; (4) optional heating of the solution to a moderate temperature, for example about 80° to 90° C., in order to dissolve substantially all of the cobalt pentammine chloride; and (5) addition of sufficient hydrochloric acid to reduce the pH to less than 1.0 to precipitate crude cobalt pentammine chloride.

After the initial digestion of the cobalt source and prior to the addition of ammonium hydroxide to the solution, it may be necessary to remove insoluble sludge, typically containing tantalum, titanium and tungsten from cobalt sources including significant amounts of scrap or sludge from cemented carbide recovery operations. Separation of precipitates or sludges from solutions in any of the above or subsequent steps may be accomplished by filtering followed by washing the filtrate. Preferably, heated slurries are cooled to a temperature below 50° C. prior to filtering.

Crude cobalt pentammine chloride may then be converted to fine particle size cobalt metal powder by the following method: (1) forming a solution of up to about 500 grams per liter of the cobalt pentammine chloride in a 1 to 6% ammonia solution; (2) digesting the cobalt pentammine chloride solution for about 2 to 10 hours at a temperature of about 80° to 100° C. in order to form a cobalt-containing precipitate; (3) separating the precipitate from the solution; and (4) heating the precipitate in a reducing atmosphere for a time and temperature sufficient to reduce the precipitate to cobalt metal powder, typically having a Fisher Sub Sieve Size (FSSS) of 1.7 or less. After dissolving the crude cobalt pentammine chloride in ammonia solution and prior to digestion, it may again be necessary to remove insoluble sludge. Cation impurities other than iron in the solution will usually be in the range of about 100 parts per million to 1 weight percent. Iron will usually be less than 1000 parts per million. Cationic impurities of less than 100 parts per million may also be achieved by one or more optional recrystallizations of the pure cobalt pentammine chloride prior to digestion to form the cobalt-containing precipitate.

Reduction is typically carried out in a hydrogen atmosphere for a time of from about 1 to 6 hours at a temperature within the range of about 350° C. to 600° C.

In the above-described basic method, mother liquor from the second digestion step contains various cobalt species in solution. Such species may include cobalt pentammine chloride, due to incomplete conversion to the cobalt-containing precipitate, and cobalt hexammine chloride, which is incidentally formed during formation of the pentammine species, and is not converted to precipitate during digestion. The mother liquor typically contains up to 0.2 weight percent of cobalt.

Accordingly, the present invention is an improvement of the above-described basic method wherein the mother liquor from the second digestion step and any acid precipitation steps is treated to convert residual cobalt species in solution to a cobalt-containing precipitate, and the precipitate either reduced to cobalt metal powder or recycled by adding it to the cobalt source for repetition of the basic method.

Referring now to the Drawing, which is a flow diagram of one embodiment of the overall method, the basic method is depicted as a multi-step method on the left-hand side of the diagram, beginning with digestion of the cobalt source in HCl solution and ending with heating to reduce the cobalt-containing precipitate to cobalt metal powder. The acid precipitation, "recrystallization" and the second digestion step of this method leaves residual cobalt species in the mother liquor.

According to one embodiment of an improvement of this method, the mother liquors from the above steps are combined, and the resultant solution treated with an alkali or alkaline earth metal hydroxide such as NaOH, in an amount sufficient to form a cobalt-containing precipitate, and preferably in an amount sufficient to precipitate substantially all of the cobalt in solution. Such amount would be at least the stoichiometric amount to permit the formation of cobaltic hydroxide. This precipitate, depending upon its impurity content and the final end use envisioned for the cobalt metal powder, may after separation either be: heated in a reducing atmosphere to form cobalt metal powder; redissolved in HCl and reprecipitated with hydroxide to remove impurities, followed by reducing to cobalt metal powder; or recycled by adding it to the cobalt source for reprocessing.

EXAMPLE I

To mother liquor remaining from the thermal decomposition of 45 grams of cobalt pentammine chloride and containing about 0.8 grams of cobalt, was added about 35 grams per liter of NaOH, and the liquor then was heated at about 90° C. for about 5 hours. A black cobalt-containing precipitate was formed and collected by filtration. Cobalt remaining in the liquor was less than 0.001 grams per liter.

While there has been shown and described what are at present considered the preferred embodiments of the invention it will be obvious to those skilled in the art that various changes and modifications may be made therein without departing from the invention as defined by the appended claims.

INDUSTRIAL APPLICABILITY

The method described and claimed herein is particularly useful in the formation of extra fine particle size, (FSSS) of up to 1.7 high purity (cation impurities of less than 100 parts per million) cobalt metal powder, which is useful, for example, as a starting material in the formation of cemented carbides, e.g., tungsten carbide.

I claim:

1. An improved method for producing cobalt metal powder, the basic method comprising: digesting a cobalt source in a HCl solution, adding ammonium hydroxide to form cobaltous pentammine chloride in solution; oxidizing the solution to form cobaltic pentammine chloride; digesting the solution to form a cobalt-containing precipitate; and heating the precipitate in a reducing atmosphere to obtain cobalt metal powder;

characterized by the improvement comprising:

(a) adding a hydroxide selected from the group consisting of alkali metal and alkaline earth metal hydroxides to the mother liquor remaining after formation of the cobalt-containing precipitate and containing residual cobalt species in solution to form a cobalt-containing precipitate.

2. The method of claim 1 wherein the precipitate formed by the addition of hydroxide to the mother liquor is heated in a reducing atmosphere to obtain cobalt metal powder.

3. The method of claim 1 wherein the precipitate formed by the addition of hydroxide to the mother liquor is added to the cobalt source and recycled by repeating at least the basic method of claim 1 to obtain cobalt metal powder.

4. The method of claim 1 wherein the sodium hydroxide is added to the mother liquor.

5. The method of claim 2 or 3 wherein the cobalt-containing precipitate is heated in a hydrogen atmosphere for about 1 to 6 hours at a temperature of about 350° C. to 600° C.

6. The method of claim 1 wherein following digestion of the cobalt source, and prior to formation of cobaltous pentammine chloride solution, insoluble impurity-containing sludge is removed.

7. The method of claim 1 wherein following formation of the cobaltic pentammine chloride, the solution is heated to dissolve substantially all of the cobaltic pentammine chloride.

8. The method of claim 1 wherein following formation of the cobaltic pentammine chloride, hydrochloric acid is added to the solution to precipitate cobaltic pentammine chloride, the precipitate is redissolved in ammonia solution, and insoluble impurity-containing sludge is removed.

9. The method of claim 8 wherein the steps of claim 8 are repeated one or more times to remove further impurities from the cobaltic pentammine chloride.

10. The method of claim 8 or 9 wherein the mother liquor remaining from the acid precipitation of cobaltic pentammine chloride is combined with the mother liquor remaining after formation of the cobalt-containing precipitate, prior to addition of hydroxide.

* * * * *